United States Patent
Moulton

(10) Patent No.: US 9,296,021 B2
(45) Date of Patent: Mar. 29, 2016

(54) PORTABLE FILTRATION APPARATUS AND METHOD OF USING SAME

(71) Applicant: Cleanway Environmental Partners, Inc., Portland, OR (US)

(72) Inventor: Matthew Moulton, Portland, OR (US)

(73) Assignee: Cleanway Environmental Partners, Inc., Portland, OR (US)

(*) Notice: Subject to any disclaimer, the term of this patent is extended or adjusted under 35 U.S.C. 154(b) by 287 days.

(21) Appl. No.: 14/174,899

(22) Filed: Feb. 7, 2014

(65) Prior Publication Data

US 2014/0224238 A1    Aug. 14, 2014

Related U.S. Application Data

(60) Provisional application No. 61/762,867, filed on Feb. 9, 2013.

(51) Int. Cl.
| | |
|---|---|
| *B08B 3/02* | (2006.01) |
| *B08B 17/02* | (2006.01) |
| *B01D 29/085* | (2006.01) |
| *B01D 29/27* | (2006.01) |
| *B01D 35/027* | (2006.01) |
| *B01D 35/34* | (2006.01) |

(52) U.S. Cl.
CPC .............. *B08B 3/02* (2013.01); *B08B 17/025* (2013.01); *B01D 23/28* (2013.01); *B01D 29/27* (2013.01); *B01D 35/0276* (2013.01); *B01D 35/34* (2013.01); *B08B 2203/0229* (2013.01)

(58) Field of Classification Search
None
See application file for complete search history.

(56) References Cited

U.S. PATENT DOCUMENTS

| | | | |
|---|---|---|---|
| 5,232,587 A | 8/1993 | Hegemier et al. | |
| 5,405,539 A | 4/1995 | Schneider | |
| 5,643,445 A | 7/1997 | Billias et al. | |
| 5,853,581 A * | 12/1998 | Rayborn ................ | A47J 43/24 |
| | | | 210/241 |
| 6,884,343 B2 | 4/2005 | Harris et al. | |
| 8,088,279 B2 | 1/2012 | McInnis et al. | |
| 8,221,632 B2 | 7/2012 | McInnis et al. | |
| 8,343,357 B2 | 1/2013 | Horner | |
| 8,608,956 B2 | 12/2013 | Moulton et al. | |
| 2001/0030150 A1 | 10/2001 | Remon | |
| 2005/0051499 A1 | 3/2005 | Nino | |
| 2005/0183997 A1 | 8/2005 | Happel et al. | |
| 2011/0303623 A1* | 12/2011 | Caldwell ................ | C02F 1/003 |
| | | | 210/807 |

OTHER PUBLICATIONS

Copending U.S. Appl. No. 14/181,060.

* cited by examiner

*Primary Examiner* — Benjamin Kurtz
(74) *Attorney, Agent, or Firm* — Hancock Hughey LLP

(57) ABSTRACT

A lightweight, portable filter system that is especially adapted for use in commercial kitchen cleaning services such as hoods used in commercial kitchens is described. The invention is defined by a container adapted for holding a filter and which has a drain opening that may be connected to the usual drain. A filter is suspended in the interior of the container with a special structure that allows for quick and easy insertion of the filter and removal of the filter when it is spent and the top of the filter is open to define a relatively large opening. In use, the tarp that is used to isolate a hood during cleaning is tucked into the opening into the filter so that effluent that flows from the hood during cleaning, and the cleaning fluids (water, degreasers, etc.) are channeled into the filter. The material used for the filter is selected for the particular type of cleaning that is being done, and in any event removes the desired compounds from the effluent stream. The liquids flowing through the filter flow into the container, out the drain opening and into a drain or where ever the effluent properly is intended to flow.

15 Claims, 6 Drawing Sheets

PORTABLE FILTRATION APPARATUS AND METHOD OF USING SAME

FIELD OF THE INVENTION

This invention relates to filters for removing contaminants from water and more specifically to a light weight and portable filter apparatus that is especially adapted for use in situations where a portable filter may offer advantages.

BACKGROUND

Most restaurants have exhaust hoods over grills. The hoods collect fats, oils and grease and other compounds—that are produced during cooking. The hoods have a variety of structures for removing the gunk from the air that flows through the hood—filters of various descriptions, traps, etc., and as would be expected, the hoods require frequent cleaning to keep the hoods clean. Indeed, many cities, towns and municipalities mandate regular and frequent cleaning of kitchen hoods. When the hoods are properly maintained the effluent from the hoods, both airborne and water borne, is minimized. However, when a hood is improperly maintained and not regularly cleaned there can be a significant amount of compounds released into both the air and water.

Given the demand for frequent cleaning of hoods, there are many companies that specialize in cleaning commercial kitchen hoods. In a typically cleaning process, the cleaning company shows up at the restaurant during non-working hours and isolates the hood with a plastic tarp that is attached to the hood and which serves to funnel the fats, oils, greases, water, degreasing compounds, surfactants, etc. that are generated by or used in the cleaning process—collectively, "effluent" into a drain. The tarp is located below the hood so that the effluent does not end up on the grills. During the cleaning process, fats, oils and greases that are accumulated in the hood and its filters is removed with a variety of techniques and compounds, and with the use of pressure washing wands. The waste products flow with water and degreasing compounds down the funneled tarp and down a drain, which usually includes some kind of grease trap. But unless the drain is fully equipped to remove the waste products from the effluent stream before they enter the sewer system, a significant amount of oils and greases thus enter into the municipal sewer system. While most municipal waste water treatment systems are equipped to deal with fats, oils and greases in effluent, these compounds do result in increased costs to everyone involved.

The present invention is directed to a relatively light weight, portable filter system that is especially adapted for use in the commercial kitchen cleaning services described above. The invention is defined by a container adapted for holding a filter and which has a drain opening that may be connected to the usual drain. A filter is suspended in the interior of the container with a special structure that allows for quick and easy insertion of the filter and removal of the filter when it is spent and the top of the filter is open to define a relatively large opening. In use, the tarp that is used to isolate a hood during cleaning is tucked into the opening into the filter to define a flow path that effluent that is removed from the hood during cleaning, the cleaning fluids (water, degreasers, etc.) are channeled into the filter. The material used for the filter is selected for the particular type of cleaning that is being done, and in any event removes the desired compounds from the effluent stream. The liquids flowing through the filter flow into the container, out the drain opening and into the drain (or where ever the effluent properly is intended).

It is possible and even likely that at some time in the near future, some municipalities and regulatory authorities such restaurant inspection authorities and health departments, etc., will begin making routine cleaning of restaurant hoods mandatory. This would, among other things, increase the frequency at which hoods are cleaned. While this would be a desirable result from many different perspectives, it emphasizes the need for apparatus such as that described herein to control and minimize effluent that results from such cleaning activities.

While the invention is described herein in terms of its use with kitchen hood cleaning, it will be appreciated that the invention may be used in any number of settings and for cleaning any number of devices, including for example mobile truck cleaning services, home cleaning services and the like. All such devices are sometimes referred to herein as "fixtures."

BRIEF DESCRIPTION OF THE DRAWINGS

The invention will be better understood and its numerous objects and advantages will be apparent by reference to the following detailed description of the invention when taken in conjunction with the following drawings.

DETAILED DESCRIPTION

Figure 1:
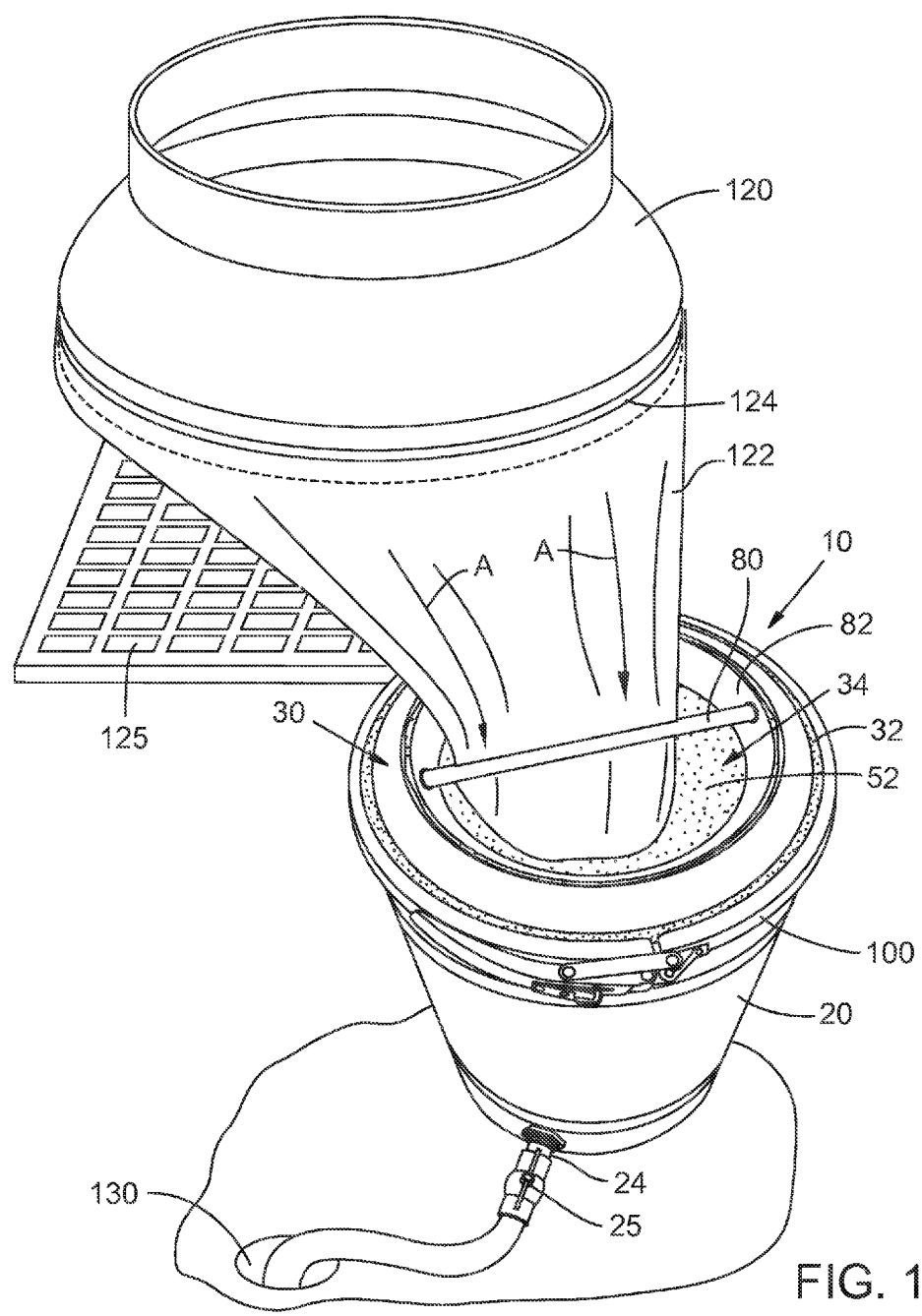
FIG. 1 is a schematic view illustrating how a tarp that is used to isolate a hood during cleaning is tucked into the filter apparatus according to the present invention, and illustrating the filter apparatus positioned adjacent a commercial grill and the hood.

With reference to the figures, a filter apparatus 10 according to the present invention comprises a container 20 that has an open interior 22 and a drain 24 near the bottom of the container, and a tarp 122 that is used in combination with the container to define a flow path of effluent from the object being cleaned, for instance a hood 120, to the container. The drain 24 preferably includes a valve 25; the drain allows liquid in the open interior 22 to drain from the container. The open top of the container has an upper peripheral edge 26 that defines an inwardly projecting shoulder 28. Although not shown, container 20 may have casters on the bottom to make it easy to move about.

Figure 4:
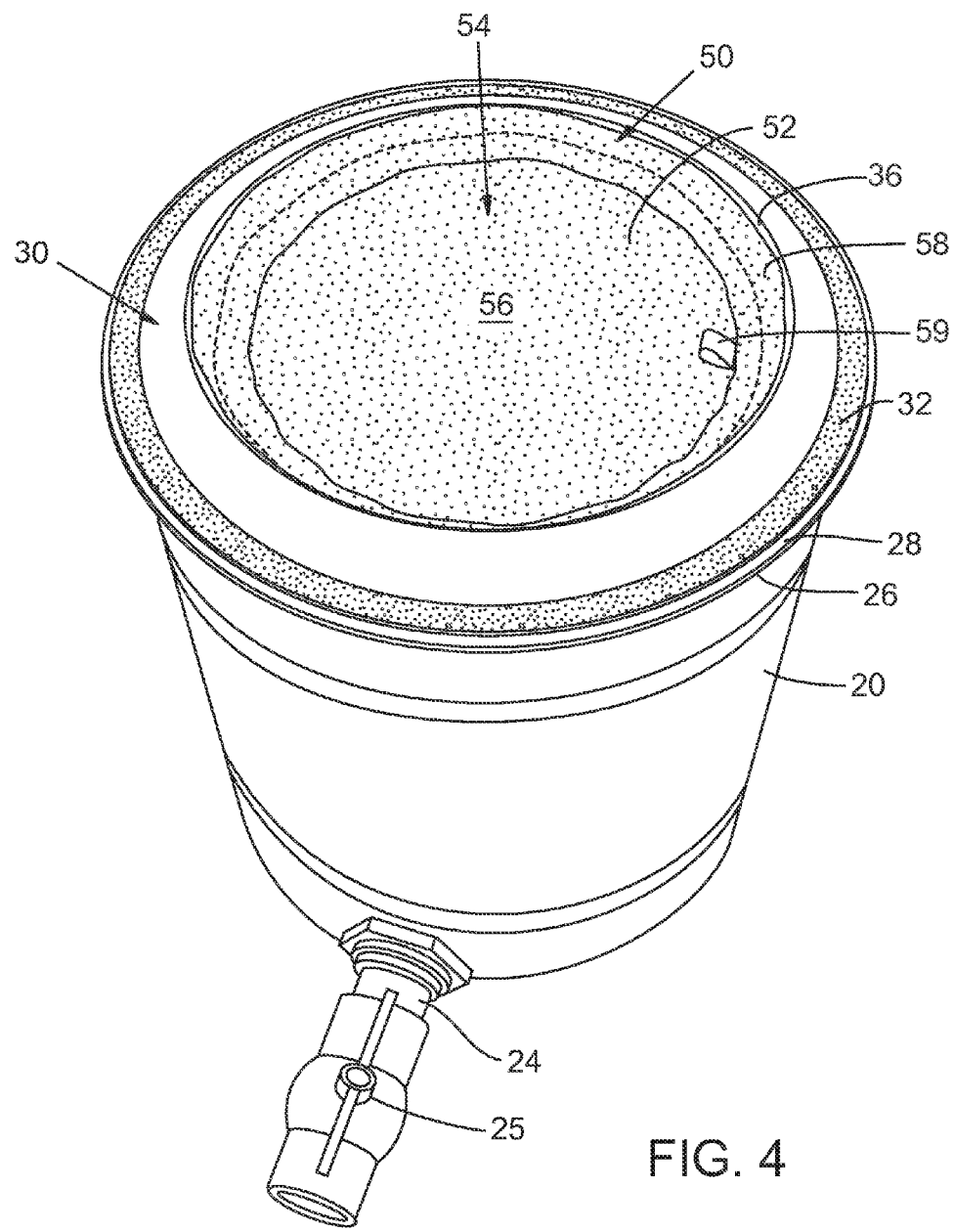
FIG. 4 is an upper perspective view of the apparatus shown in FIG. 3 with the filter suspended on the filter support plate.
Figure 5:
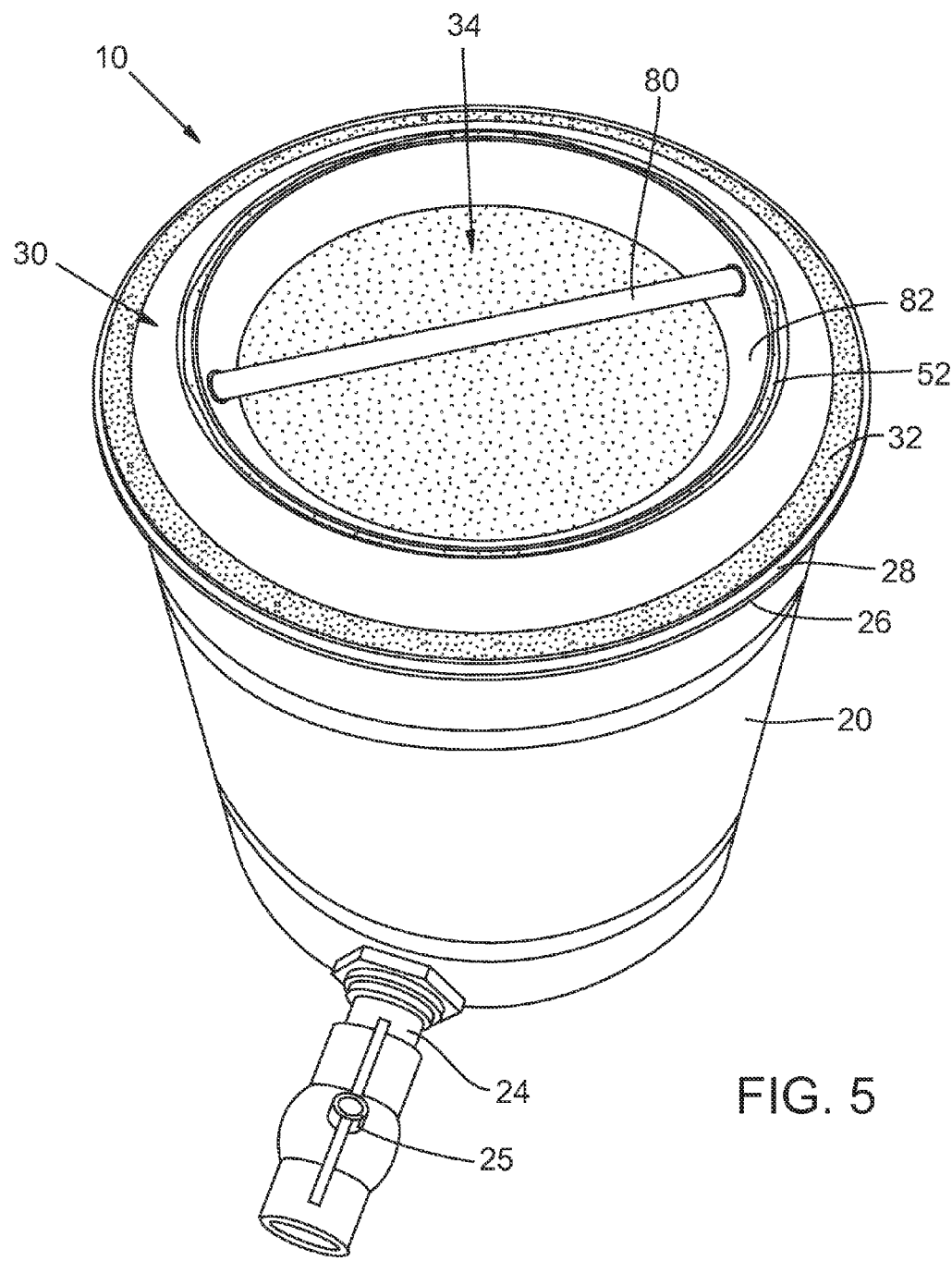
FIG. 5 is an upper perspective view of the apparatus shown in FIG. 4 with the retaining ring installed.

With reference to FIG. 1, filter apparatus 10 is illustrated schematically and in use with a kitchen hood 120 that is being cleaned. A kitchen hood such as hood 120 shown in FIG. 1 is isolated and enclosed with a plastic tarp that is attached to the hood and which serves to funnel the fats, oils, greases, water, degreasing compounds, surfactants, etc. that are generated by or used in the cleaning process into a drain. The tarp is located below the hood so that the effluent from the cleaning process does not end up on the grills and so that the tarp defines a flow path of materials flow through the flow path to the filter apparatus. During the cleaning process, fats, oils and greases that are accumulated in the hood and its filters is removed with a variety of techniques and compounds, and with the use of pressure washing wands. The waste products along with water and degreasing compounds—effluent—flow down the funneled tarp, into the filter apparatus where compounds such as oils and grease are removed, and the liquids ultimately flow into and down a drain 130. As shown in FIG. 1, a tarp 122 is wrapped around the hood 120 and secured at the upper edges with a securing tape 124 (or other conventional methods) so that the tarp effectively surrounds the hood. The tarp may be a plastic sheet or a sheet made of another appropriate water resistant material. The tarp 122 completely surrounds and encloses the hood 120 so that fats, oils and greases and other compounds that are to be removed from the hood during cleaning do not end up on the underlying grills 125. The tarp 122, the upper edge of which is taped and secured to the hood, is gathered in the area below the hood 120 and the gathered tarp is inserted into filter apparatus 10 through central opening 34. If a retaining ring 80 is used, the retaining ring is installed as shown in FIGS. 4 and 5 such that the tarp is captured between the retaining ring 80 and the filter bag 52—the retaining ring keeps the tarp in place during the cleaning operation. Use of filter apparatus 10 is further detailed below. It will be appreciated therefore that the tarp is attached to the object to be cleaned, in this case a hood, and encloses the object in an enclosed space defined by the tarp, and defines a flow path from the object to the filter components that are described below.

Figure 2:
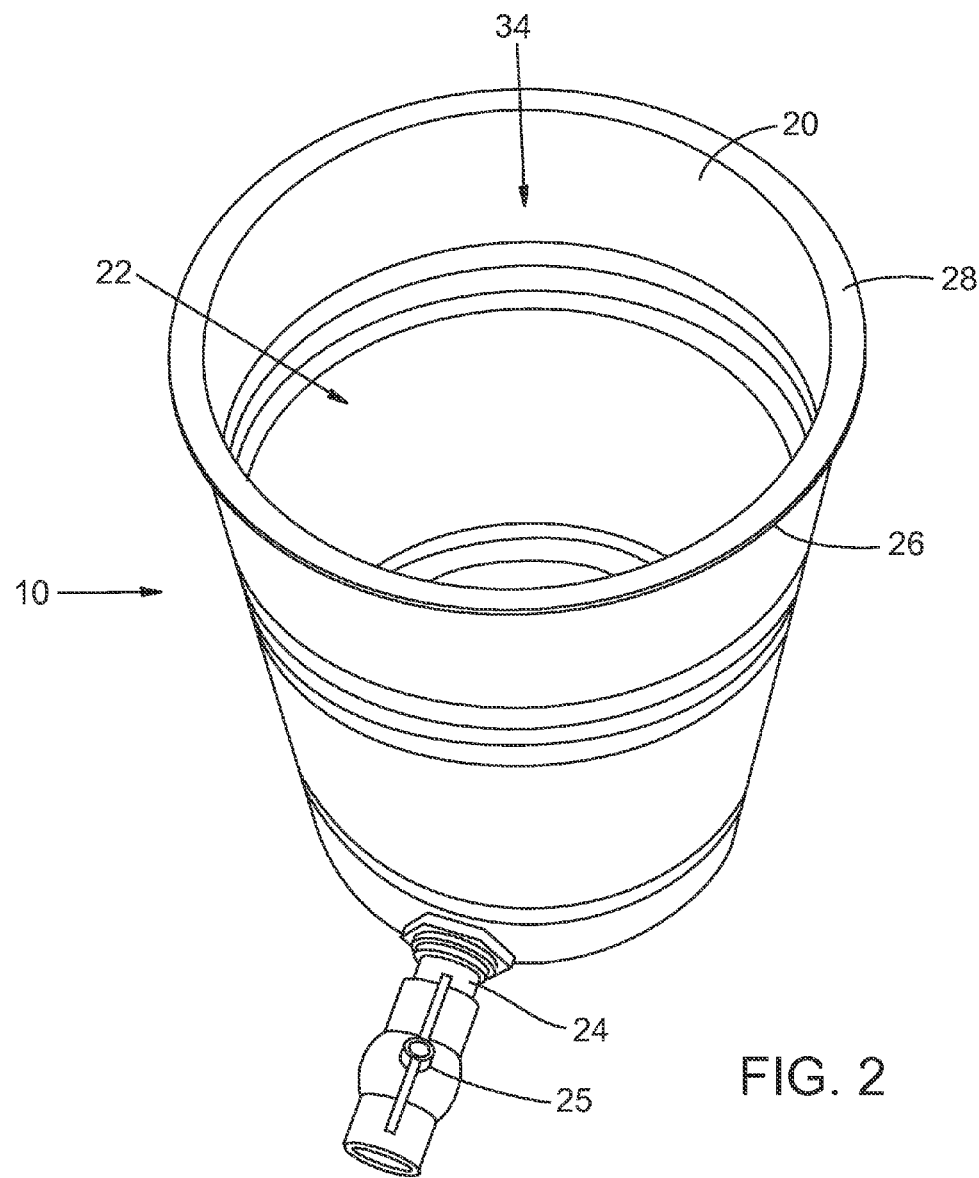
FIG. 2 is an upper perspective view of the container used as a component of the filter apparatus according to the present invention, with the filter and other components removed.

Filter apparatus 10 and its various components are described in more detail now with specific reference to FIGS. 2 through 6. In FIG. 2, filter apparatus 10 comprises a container 20 that has an open interior 22 and a drain 24 near the bottom of the container. The container may be of any appropriate size but one preferred size for the container 20 has a capacity of approximately 50 US gallons. This volume is sufficiently large enough to receive the volume of materials flowing into the container during a typical hood-cleaning process and yet small enough to allow the container to be moved about relatively easily. The drain 24 preferably includes a valve 25; the drain allows liquid in the open interior 22 to drain from the container. As noted previously, the open top of the container has an upper peripheral edge 26 that defines an inwardly projecting shoulder 28.

Figure 3:
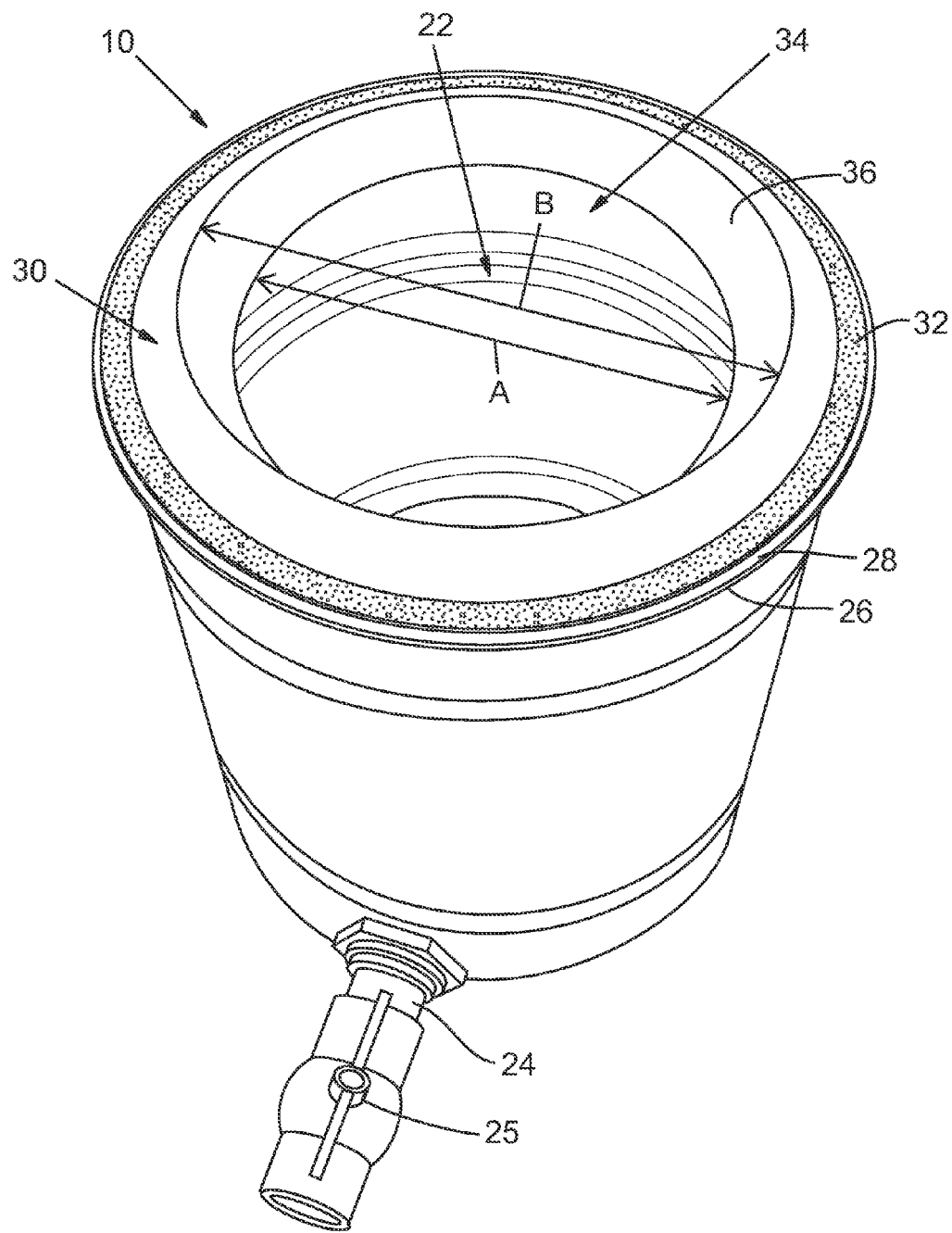
FIG. 3 is an upper perspective view of the container shown in FIG. 2 with the filter support plate installed.

With reference to FIG. 3, a filter support plate 30 has been installed on the container 20; the support plate 30 rests on and is supported by inwardly projecting shoulder 28. The support plate preferably includes a seal 32 extending around the outer peripheral edge of the support plate to provide a seal between the plate and the container. The seal is preferably a relatively soft material such as a rubber or like material that is not degraded by the types of compounds and chemicals that flow through the filter apparatus 10. The filter support plate 30 has a central opening 34 that opens into the open interior 22 of the container and which is defined by an inwardly and downwardly sloping peripheral shoulder 36. As detailed below, the sloping shoulder 36 supports the filter material. The diameter of the central opening 34 at the lower edge of sloping shoulder is defined as diameter A. Diameter A is smaller than the diameter B in FIG. 3, which is the diameter of the central opening 34 at the upper edge of the sloping shoulder 36—that is, the diameter of the central opening at the level of the upper surface of the support plate 30.

It is to be understood that the invention described herein may be used with many different types of barrels and containers and that the container 20 shown in the drawings and described herein is exemplary only. As such, it will be readily evident that the manner in which the support plate 30 fits onto and interacts with the top of the container will vary according to the specifications of the container that is being used. In addition, a "universal" support plate that is sized to fit most standard containers could be fabricated with a downwardly extending peripheral edge that serves to locate the plate on the open end of the barrel and keep the plate in place during use.

Turning to FIG. 4, a filter 50 has been inserted into apparatus 10 by inserting the filter material, which defines a filter bag 52 having an open upper end 54 and a closed lower end 56. The filter bag 52 is sized so that the closed lower end 56 is suspended near the bottom interior of the container 20. The filter bag has a peripheral, circular loop 58 sewn at the upper edge of the filter bag and a metal ring (not visible) is retained in the loop 58. The diameter of the metal ring is intermediate between diameters A and B shown in FIG. 3. Accordingly, when the filter bag 52 is inserted through central opening 34 the filter bag is suspended on filter support plate by virtue of the metal ring making contact with the sloping shoulder 36. As seen in FIG. 4, the filter bag 52 has a grab handle 59 sewn into the interior portion of the filter bag to allow it to be easily grabbed and removed.

It will be appreciated that the combination of inwardly and downwardly sloping shoulder 36 with the metal ring that is retained in loop 58 makes for an easily assembled and disassembled fit between the filter bag 52 and the support plate 30. But it will be understood that there are numerous equivalent mechanical connections between the support plate and the filter basket that work equally well. To provide just one example of a mechanical equivalent, the support plate could have an inwardly projecting peripheral lip that defines a support shelf and the metal ring could rest on the support shelf. Those of skill in the art will know of other equivalent structures.

In FIG. 5 a retaining ring 80, which includes an outer peripheral shoulder 82 that is angled inwardly and downwardly at about the same angle as sloping shoulder 36, is installed with filter apparatus 10 that includes the support plate 30 and filter bag 52. The retaining ring 80 is an optional component, but as detailed below is useful to keep the tarp material in place in the filter apparatus 10 during use.

Figure 6:
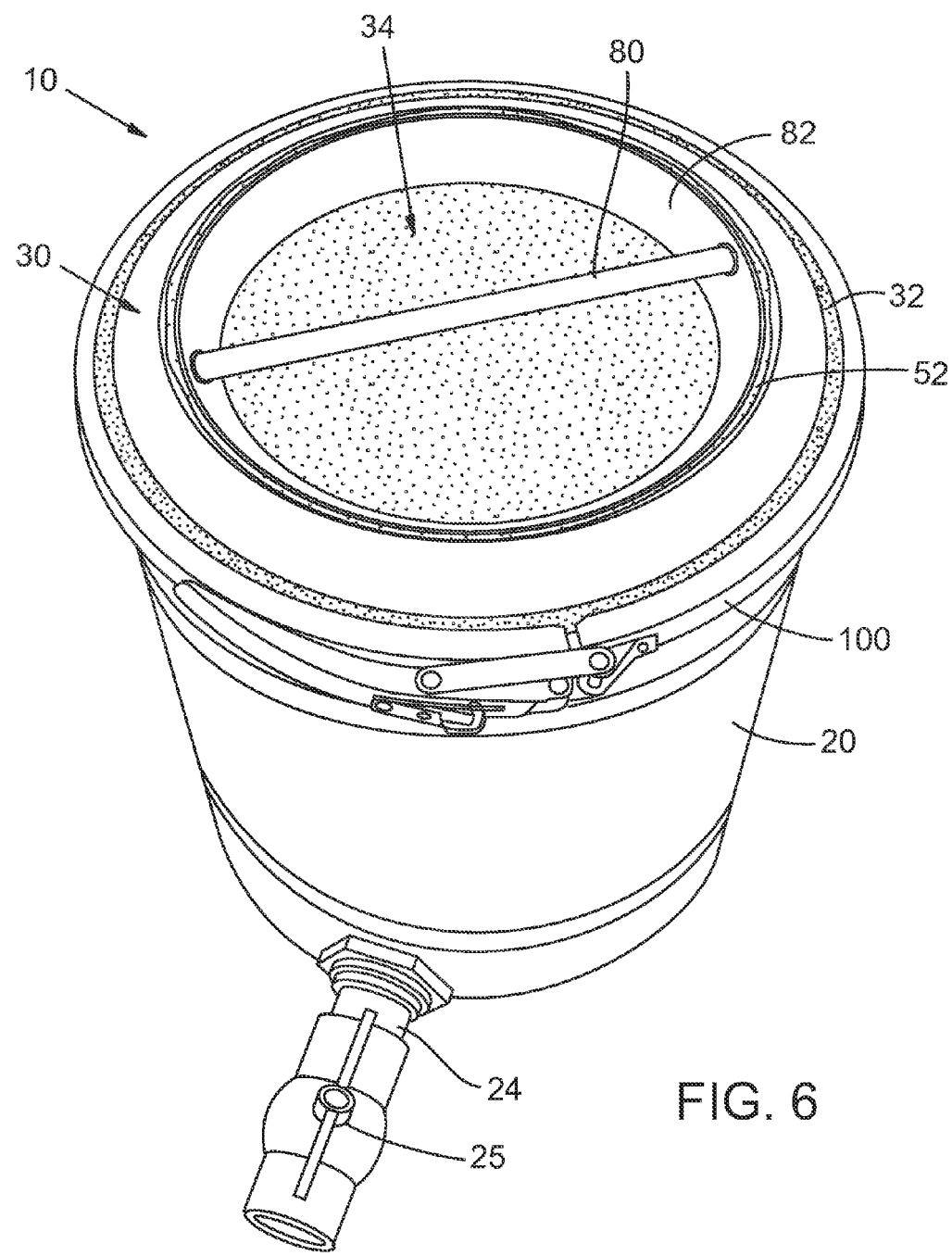
FIG. 6 is an upper perspective view of the fully assembled filter apparatus according to the present invention, including a retaining clip.

FIG. 6 is a view very similar to FIG. 5 except a clip 100 that retains filter support plate 30 firmly attached to container 20 is shown installed. Clip 100 is a standard retaining clip that may be opened and closed to allow the support plate 30 to be installed and secured easily.

Use of filter apparatus 10 is further detailed now with returning reference to FIG. 1. A tarp 122 is wrapped secured around hood 120 with tape 124. The tarp 122 defines a flow path, shown with arrows A, for fats, oils and greases and other compounds that are to be removed from the hood during cleaning do not end up on the underlying grills 125 and instead flow into the container 20. Thus, the tarp is gathered in the area below the hood 120 and the gathered tarp is inserted into a container 20 that has been fitted with a filter bag 52, through central opening 34 as shown. If a retaining ring 80 is used, the retaining ring is installed as shown in FIGS. 5 and 6 such that the tarp is captured between the retaining ring 80 and the filter bag 52—the retaining ring stabilizes the tarp relative to the container 20 and thereby keeps the tarp in place during the cleaning operation.

The cleaning crew cleans the hood using standard procedures and all effluent produced during cleaning flows down the tarp through the flow path—arrows A, which effectively funnels the effluent into the filter bag 52 that is suspended in container 20. Solids contained in the effluent are physically trapped or otherwise entrained therein by the media material of the filter bag 52. In the case of cleaning kitchen hoods, a variety of degreasing compounds may be used and these may cause fats, oils and greases to become emulsified and thus in a liquid. The media that is used to fabricate filter bag 52 is selected to prevent these emulsified compounds from flowing through the filter bag while allowing liquid to flow through the bag and out of the container 20 through the drain 24, and then into, for example, a floor drain 130.

One preferred material used for the filter bag 52 is available from Eco-Tec, Inc. (www.eco-tec-inc.com) and is sold under the brand name Adsorb-It®. Other materials may similarly be used.

As noted, the filter apparatus 10 according to the present invention is not limited to use with cleaning kitchen hoods. The device may also be beneficially used in other situations where a local effluent needs to be filtered before fluid enters the sewer system. A few examples include mobile automobile and truck washing providers and mobile cleaning services for homes and the like.

While the present invention has been described in terms of a preferred embodiment, it will be appreciated by one of ordinary skill that the spirit and scope of the invention is not limited to those embodiments, but extend to the various modifications and equivalents as defined in the appended claims.

The invention claimed is:

1. Portable filtration apparatus for use in cleaning a fixture, comprising:
   a tarp adapted for attachment to said fixture to thereby enclose the fixture and thereby define a flow path from said fixture to a tarp open end;
   a container having an open end and a closed end;
   a drain valve in the closed end of the container;
   a support plate adapted for covering the open end of the container and having an opening formed therein;
   a filter in the container, said filter suspended from the support plate and extending downwardly through the opening therein and into the container, said filter having an open end and a closed end;
   wherein said flow path extends into said filter.

2. The portable filtration apparatus according to claim 1 wherein the filter defines filter media selected to entrain desired compounds removed from the fixture.

3. The portable filtration apparatus according to claim 2 wherein the opening in the support plate is defined by an inwardly and downwardly sloping shoulder that defines a first diameter at an upper perimeter and a second diameter at a lower perimeter, the first diameter larger than the second diameter.

4. The portable filtration apparatus according to claim 3 wherein the filter includes a ring around the open end and the ring has a ring diameter intermediate between the diameter of the first diameter and the second diameter.

5. The portable filtration apparatus according to claim 4 wherein the filter is suspended from the support plate with the ring on the sloping shoulder of the support plate.

6. The portable filtration apparatus according to claim 5 in which the support plate defines a perimeter and including a seal around the perimeter that defines a seal between the support plate and the container.

7. The portable filtration apparatus according to claim 6 including a clamp for fixing the support plate to the container.

8. The portable filtration apparatus according to claim 5 further including a retaining ring in the open end of said filter.

9. The portable filtration apparatus according to claim 8 in which the retaining ring includes an inwardly and downwardly sloping shoulder that is angled at approximately the same slope as the shoulder of said shoulder in said support plate.

10. The portable filtration apparatus according to claim 9 in which the ring is captured between the retaining ring and the shoulder in said support plate.

11. The portable filtration apparatus according to claim 8 wherein the retaining ring stabilizes said tarp relative to said container.

12. The portable filtration apparatus according to claim 1 in which the fixture is a kitchen hood.

13. A method for filtering effluent resulting from cleaning a fixture comprising the steps of:
   a) effectively enclosing said fixture with a tarp and defining a flow path through said tarp from said fixture to a tarp open end;
   b) providing a filter for receiving effluent from cleaning the kitchen hood, the filter including a container having an open end and a closed end, a drain valve in the closed end, a support plate adapted for covering the open end and the support plate having an opening formed therein, and a filter in the container, said filter suspended from the support plate and extending downwardly through the opening therein and into the container, said filter open at an upper end thereof; and
   c) inserting said tarp open end into the open upper end of said filter so that said flow path extends into said filter;
   d) cleaning said fixture so that effluent flows through the flow path and into said filter.

14. The method according to claim 13 including the step of retaining the tarp relative to said container.

15. The method according to claim 14 including the step of filtering select compounds from said effluent with said filter.

\* \* \* \* \*